(12) United States Patent
Haycock et al.

(10) Patent No.: US 6,529,037 B1
(45) Date of Patent: Mar. 4, 2003

(54) VOLTAGE MODE BIDIRECTIONAL PORT WITH DATA CHANNEL USED FOR SYNCHRONIZATION

(75) Inventors: Matthew B. Haycock, Beaverton, OR (US); Stephen R. Mooney, Beaverton, OR (US); Aaron K. Martin, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/951,909

(22) Filed: Sep. 13, 2001

(51) Int. Cl.[7] .............................. H03K 19/003
(52) U.S. Cl. ........................... 326/30; 326/26
(58) Field of Search ............... 326/30, 86, 87, 326/26–28

(56) References Cited

U.S. PATENT DOCUMENTS

| | | | |
|---|---|---|---|
| 4,573,168 A | 2/1986 | Henze et al. | 375/36 |
| 4,624,006 A | 11/1986 | Rempfer et al. | 377/69 |
| 5,134,311 A * | 7/1992 | Biber et al. | 326/30 |
| 5,216,667 A | 6/1993 | Chu et al. | 370/276 |
| 5,218,239 A | 6/1993 | Boomer | 307/443 |
| 5,253,249 A | 10/1993 | Fitzgerald et al. | 370/24 |
| 5,325,355 A | 6/1994 | Oprescu et al. | 370/282 |
| 5,457,406 A | 10/1995 | Takada et al. | 326/30 |
| 5,481,207 A | 1/1996 | Crafts | 326/86 |
| 5,490,171 A | 2/1996 | Epley et al. | 375/257 |
| 5,530,377 A | 6/1996 | Walls | 326/30 |
| 5,541,535 A | 7/1996 | Cao et al. | 326/83 |
| 5,578,939 A | 11/1996 | Beers et al. | 326/30 |
| 5,579,336 A | 11/1996 | Fitzgerald et al. | 375/219 |
| 5,604,450 A | 2/1997 | Borkar et al. | 326/82 |
| 5,621,335 A * | 4/1997 | Andresen | 326/30 |
| 5,663,661 A | 9/1997 | Dillon et al. | 326/30 |
| 5,793,248 A | 8/1998 | Lee et al. | 327/543 |
| 5,841,827 A | 11/1998 | Chevallier | 377/20 |
| 6,037,811 A | 3/2000 | Ozguc | 327/108 |
| 6,087,847 A | 7/2000 | Mooney et al. | 326/30 |
| 6,087,853 A | 7/2000 | Huber et al. | 326/83 |
| 6,118,310 A | 9/2000 | Esch, Jr. | 327/108 |
| 6,133,749 A | 10/2000 | Hansen et al. | 326/30 |
| 6,157,206 A | 12/2000 | Taylor et al. | 326/30 |
| 6,188,237 B1 | 2/2001 | Suzuki et al. | 326/30 |
| 6,366,867 B2 * | 4/2002 | Sine et al. | 326/27 |

OTHER PUBLICATIONS

Comer, D.T., et al., "A CMOS Voltage to Current Converter For Low Voltage Applications", *This information is directly fron Donald T. Comer's web site*. http://www.ee.byu.edu/faculty/comerdt/publications.html, 13 p., (Feb. 11, 1997).

Farjad—Rad, R. et al., "A 0.4–um CMOS 10–Gb/s 4–PAM Pre–Emphasis Serial Link Transmitter", *IEEE Journal of Solid–State Circuits, 34* (5), pp. 580–585, (May 1999).

Filanovsky, I.M., "Voltage Reference Using Mutual Compensation of Mobility and Threshold Voltage Temperature Effects", *ISCAS 2000—IEEE International Symposium on Circuits and Systems*, pp. V197–V200, (May 2000).

Haycock, M., et al., "A 2.5Gb/s Bidirectional Singaling Technology", *Hot Interconnects Symposium V*, pp. 1–8, (Aug. 1997).

Lee, S., et al., "A Temperature and Supply–Voltage Insensitive CMOS Current Reference", *IEICE Trans. Electron*, vol. E82–C, pp. 1562–1566, (Aug. 1999).

* cited by examiner

*Primary Examiner*—Michael Tokar
*Assistant Examiner*—James H. Cho
(74) *Attorney, Agent, or Firm*—Schwegman, Lundberg, Woessner & Kluth, P.A.

(57) ABSTRACT

A simultaneous bidirectional port coupled to a bus combines a synchronization circuit and a data transceiver circuit. The combination data and synchronization transceiver circuit synchronizes the port with another simultaneous data port coupled to the same bus. The combination data and synchronization transceiver circuit includes a driver with a variable output impedance. Prior to synchronization, the driver has an imbalanced output impedance, and after synchronization, the driver has a substantially balanced output impedance.

29 Claims, 6 Drawing Sheets

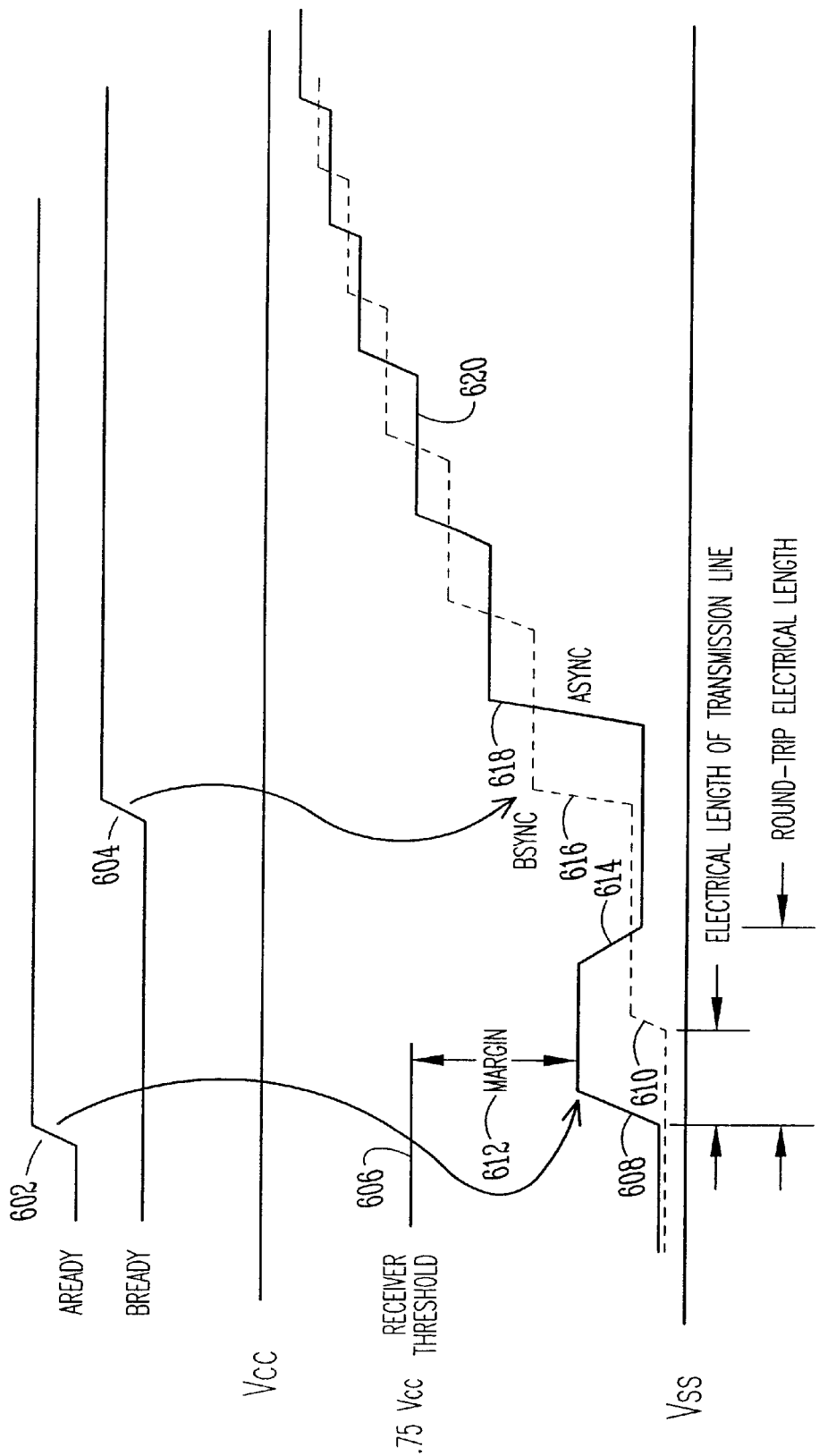

VOLTAGE MODE BIDIRECTIONAL PORT WITH DATA CHANNEL USED FOR SYNCHRONIZATION

FIELD

The present invention relates generally to digital data ports, and more specifically to bidirectional digital data ports.

BACKGROUND OF THE INVENTION

Integrated circuits typically communicate with other integrated circuits on wires that are part of a "bus." A typical bus includes many wires, or circuit board traces, connecting multiple integrated circuits. Some buses are "unidirectional," because signals only travel in one direction on each wire of the bus. Other buses are "bidirectional," because signals travel in more than one direction on each wire of the bus. In the past, most bidirectional buses were not "simultaneously bidirectional," because multiple signals did not travel on the same wire in opposite directions at the same time; instead, the bus was shared over time, and different signals traveled in different directions at different points in time. Some newer buses are "simultaneous bidirectional" buses. Simultaneous bidirectional buses allow data to travel in two directions on a single wire at the same time.

Before reliable communications can take place on a bus, the integrated circuits need to be ready to communicate, or be "synchronized," and each circuit on the bus should have information regarding the readiness of other circuits on the bus. Some circuits may need to be initialized, while others may need to become stabilized. In some bus applications, it can take an indeterminate amount of time for circuits to become ready to reliably communicate. It can be important to not drive data onto a bus until the intended receiver is ready to receive the data, especially in simultaneous bidirectional bus applications, where data is being driven in both directions at once.

For the reasons stated above, and for other reasons stated below which will become apparent to those skilled in the art upon reading and understanding the present specification, there is a need in the art for a method and apparatus to provide a synchronization mechanism for simultaneous bidirectional data buses.

BRIEF DESCRIPTION OF THE DRAWINGS

FIG. 6 shows a timing diagram of the operation of the circuit of FIG. 5.

DESCRIPTION OF EMBODIMENTS

Figure 1:
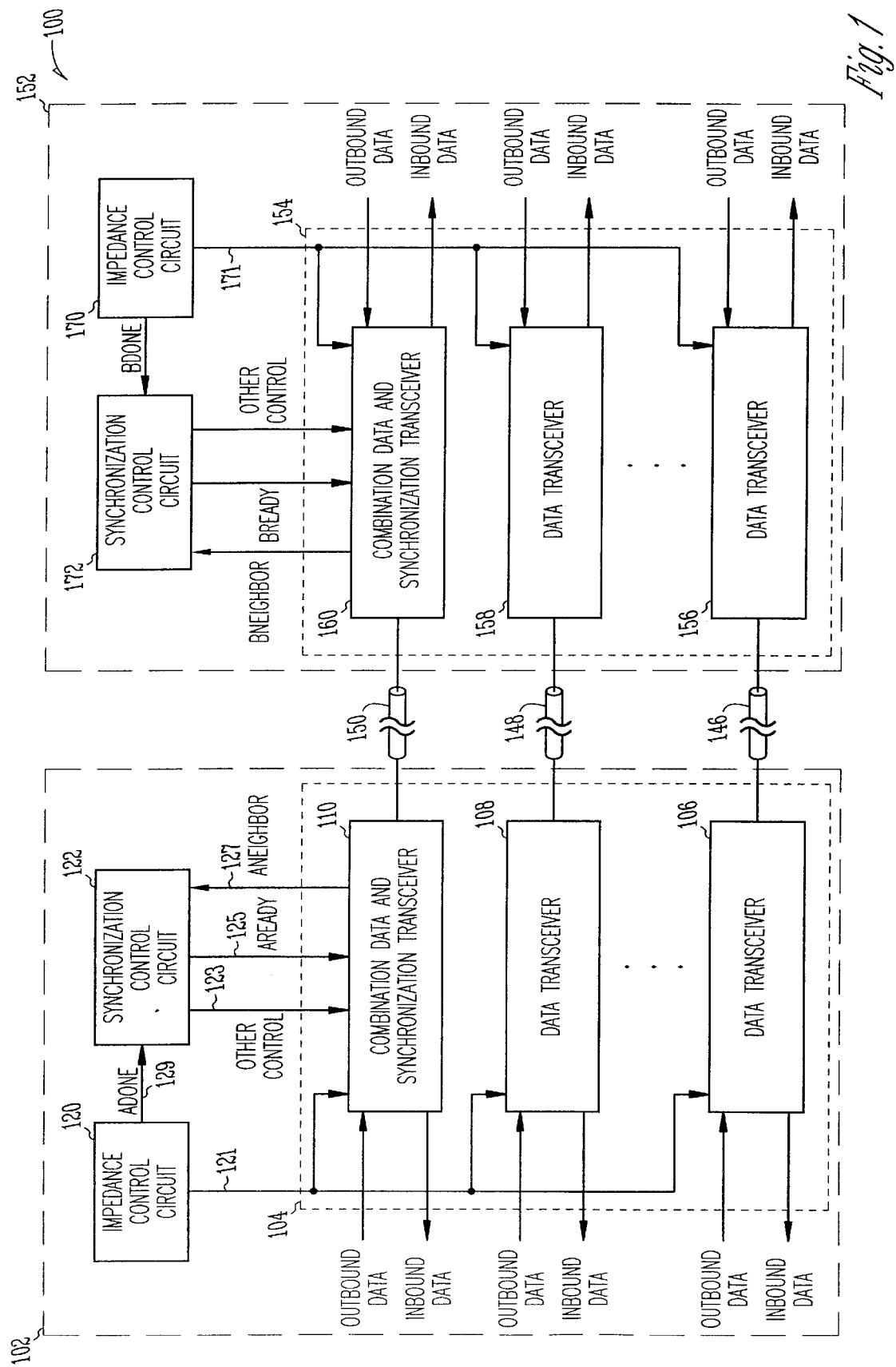
FIG. 1 shows a system employing simultaneous bidirectional ports;.

In the following detailed description of the embodiments, reference is made to the accompanying drawings that show, by way of illustration, specific embodiments in which the invention may be practiced. In the drawings, like numerals describe substantially similar components throughout the several views. These embodiments are described in sufficient detail to enable those skilled in the art to practice the invention. Other embodiments may be utilized and structural, logical, and electrical changes may be made without departing from the scope of the present invention. Moreover, it is to be understood that the various embodiments of the invention, although different, are not necessarily mutually exclusive. For example, a particular feature, structure, or characteristic described in one embodiment may be included within other embodiments. The following detailed description is, therefore, not to be taken in a limiting sense, and the scope of the present invention is defined only by the appended claims, along with the full scope of equivalents to which such claims are entitled.

The method and apparatus of the present invention provide a mechanism to synchronize multiple simultaneous bidirectional ports on the same bus. A combination data and synchronization transceiver having a variable output impedance is coupled to another similar circuit on a bidirectional bus. Prior to synchronization, the variable output impedance is set such that a pulldown impedance is lower than a pullup impedance. During this time, the combination data and synchronization transceiver is used as a synchronization transceiver. After synchronization, the variable output impedance is set such that the pullup and pulldown impedances are substantially equal, and the combination data and synchronization transceiver is used as a data transceiver. The combination data and synchronization transceiver also includes a receiver that has an input node coupled to the output of the combination data and synchronization transceiver. Prior to synchronization, the receiver operates with a threshold that is satisfied when drivers from both simultaneous bidirectional ports assert output signals, thereby alerting both ports that each is ready to communicate. After synchronization, the receiver is used as a data receiver.

FIG. 1 shows a system employing simultaneous bidirectional ports. System 100 includes integrated circuits 102 and 152. Integrated circuits 102 and 152 are coupled by a simultaneous bidirectional bus that includes conductors 146, 148, and 150. For the purposes of explanation, integrated circuit 102 is considered to be the "A" agent on the simultaneous bidirectional bus, and integrated circuit 152 is considered to be the "B" agent on the same simultaneous bidirectional bus. Signals pertaining to circuits within integrated circuit 102 are prefixed with the letter "A," and signals pertaining to circuits within integrated circuit 152 are prefixed with the letter "B."

Integrated circuit 102 includes simultaneous bidirectional port 104, impedance control circuit 120, and synchronization control circuit 122. Simultaneous bidirectional port 104 includes data transceivers 106 and 108, and combination data and synchronization transceiver 110. For simplicity, FIG. 1 shows one bidirectional port within each integrated circuit. Each integrated circuit on the simultaneous bidirectional bus can include any number of bidirectional ports, and bidirectional ports can include any number of transceivers. To simplify the explanation, each of integrated circuits 102 and 152 are shown with a single bidirectional port, and each bidirectional port is shown with two data transceivers and one combination data and synchronization transceiver.

Integrated circuit 152 includes impedance control circuit 170, synchronization control circuit 172, and simultaneous bidirectional port 154. Simultaneous bidirectional port 154 includes data transceivers 156 and 158, and combination data and synchronization transceiver 160.

The output impedance of each data transceiver within one integrated circuit also serves as a termination impedance for another data transceiver in a different integrated circuit. For example, the output impedance of data transceiver 108 serves as a termination impedance for data transceiver 158, and the output impedance of data transceiver 158 serves as a termination impedance for data transceiver 108. Each of the various data transceivers shown in FIG. 1 has a variable output impedance. Impedance control circuit 120 provides impedance control information on node 121 to the various transceivers in integrated circuit 102, and impedance control circuit 170 provides impedance control information on node 171 to the various transceivers in integrated circuit 152.

In operation, prior to synchronization, synchronization control circuits 122 and 172 control the respective combination data and synchronization transceivers and cause them to enter "synchronization mode," and function as synchronization circuits. During this time, impedance control circuits 120 and 170 set the output impedance of the other data transceivers within integrated circuits 102 and 104. Also during this time, other initialization functions can be performed. For example, receiver offsets can be adjusted and output slew rates can be programmed. In general, any operation can be performed prior to synchronization.

The synchronization process begins with synchronization control circuit 122 asserting control signals on node 123 to cause combination data and synchronization transceiver 110 to function as a synchronization circuit. The operation of combination data and synchronization transceivers is described in more detail below with reference to FIGS. 4–6. While combination data and synchronization transceiver 110 is in synchronization mode, impedance control circuit 120 sets the impedance of data transceivers 106 and 108, while synchronization control circuit 122 controls the output impedance of combination data and synchronization circuit 110. The operation of impedance control circuit 120 is described in more detail with respect to FIG. 2 below. Other types of initialization functions can also be performed during this time. For example, in some embodiments, output slew rates and receiver voltage offsets are set during this time period.

When impedance control circuit 120 has set the output impedance values, it asserts the ADONE signal to synchronization control circuit 122. Synchronization control circuit 122 then asserts the AREADY signal on node 125 to signify that integrated circuit 102 is ready to communicate. Synchronization control circuit 122 then monitors the ANEIGHBOR signal on node 127. When the ANEIGHBOR signal is asserted, both A and B agents on the simultaneous bidirectional bus are ready to communicate, and the bus is synchronized. At this time, synchronization control circuit 122 asserts control signals on node 123 to cause combination data and synchronization transceiver 110 to enter "data transceiver mode," and function as a data transceiver.

In some embodiments, other initialization functions are performed prior to asserting the AREADY signal. In these embodiments, synchronization control circuit 122 receives multiple DONE signals, one from each initialization circuit. For example, when receiver offsets are initialized, a DONE signal is asserted by a receiver offset initialization circuit (not shown) to synchronization control circuit 122. In general, synchronization control circuit 122 can be responsive to any number of DONE signals.

Synchronization control circuits 122 and 172, and impedance control circuits 120 and 170 are examples of initialization circuits that perform useful initialization functions. In some embodiments, synchronization control circuits and impedance control circuits are combined into one initialization circuit. In other embodiments, initialization circuits include additional useful initialization functions.

The initialization process just described can be performed at system startup, or after an event that cause a re-initialization. For example, when system power is applied, synchronization control circuits 122 and 172 provide start-up initialization. Also for example, when a portion of system 100 is reset or is subject to a large noise event, re-initialization may take place. Initialization can also take place during a hot-swap event, when one or more system components are removed or added to the system while power is applied.

Integrated circuits 102 and 152 utilize a single external conductor (conductor 150 in FIG. 1), for two purposes. Prior to communication taking place on the bus, the conductor is used for synchronization purposes. After synchronization, the conductor is used for simultaneous bidirectional data transmission. By utilizing a single external conductor for both data transmission and synchronization purposes, the need for a dedicated signal line for synchronization purposes is obviated. This reduces the external pin count on integrated circuits 102 and 152, which reduces the packaging cost of the integrated circuits.

In some embodiments, combination data and synchronization transceivers 110 and 160 are associated with a least significant bit on the simultaneous bidirectional port. In other embodiments, combination data and synchronization transceivers 110 and 160 are associated with a most significant bit on the simultaneous bidirectional port. In general, combination data and synchronization transceivers can be used for any bit on the bus without departing from the scope of the present invention. Further, simultaneous bidirectional ports 104 and 154 are each shown with one combination data and synchronization transceiver. In some embodiments, simultaneous bidirectional ports 104 and 154 each include multiple combination data and synchronization transceivers.

In embodiments represented by FIG. 1, integrated circuits 102 and 152 are shown having substantially similar circuits. In other embodiments, integrated circuits 102 and 152 do not have substantially similar circuits. For example, integrated circuits 102 and 152 can be processors, processor peripherals, memory devices including dynamic random access memories (DRAM), memory controllers, or any other integrated circuit employing simultaneous bidirectional ports.

In some embodiments, synchronization control circuits and impedance control circuits are one or more processors that perform the fictions indicated in software. For example, in some application specific integrated circuit (ASIC) embodiments, a microprocessor core exists in place of synchronization control circuit 122 and impedance control circuit 120.

Figure 2:
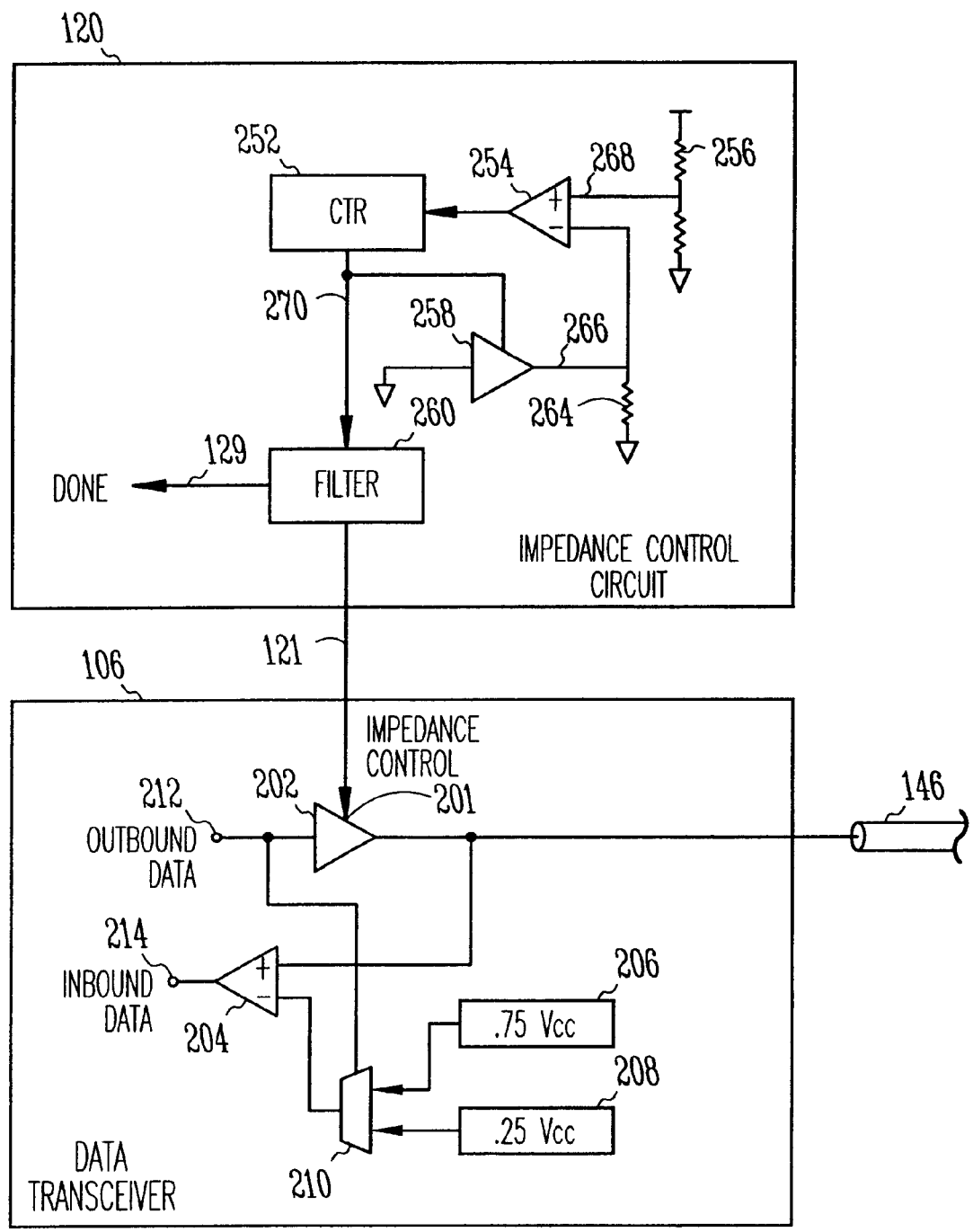
FIG. 2 shows a simultaneous bidirectional port circuit with an impedance control circuit.

FIG. 2 shows a data transceiver with an impedance control circuit. Data transceiver 106 is shown in FIG. 2 as an example data transceiver. Other data transceivers shown in FIG. 1 such as data transceivers 108, 156, and 158 can be substituted for data transceiver 106 in FIG. 2. Data transceiver 106 includes driver 202, receiver 204, multiplexer 210 and voltage references 206 and 208. The output node of driver 202 drives conductor 146, and is also the input node for receiver 204. Conductor 146 is simultaneously driven by another driver in another simultaneous bidirectional port circuit, and receiver 204 determines the logic value driven on conductor 146 by the other driver. For example, referring now back to FIG. 1, data transceivers 106 and 156 both include drivers and receivers such as driver 202 and receiver 204. The receiver in data transceiver 106 determines the logic value driven on conductor 146 by the driver in data transceiver 156, and the receiver in data transceiver 156 determines the logic value driven on the conductor by the driver in data transceiver 106.

Receiver 204 compares the voltage value on conductor 146 to the voltage value of either reference 206 or reference 208 depending on the state of the outbound data on node 212. The outbound data steers multiplexer 210 so that one of reference 206 and reference 208 is present on one of the inputs to receiver 204. Details of one embodiment of a simultaneous bidirectional port that utilizes a data transceiver similar to that shown in FIG. 2 can be found in U.S. Pat. No. 5,604,450, issued Feb. 18, 1997.

Figure 3:
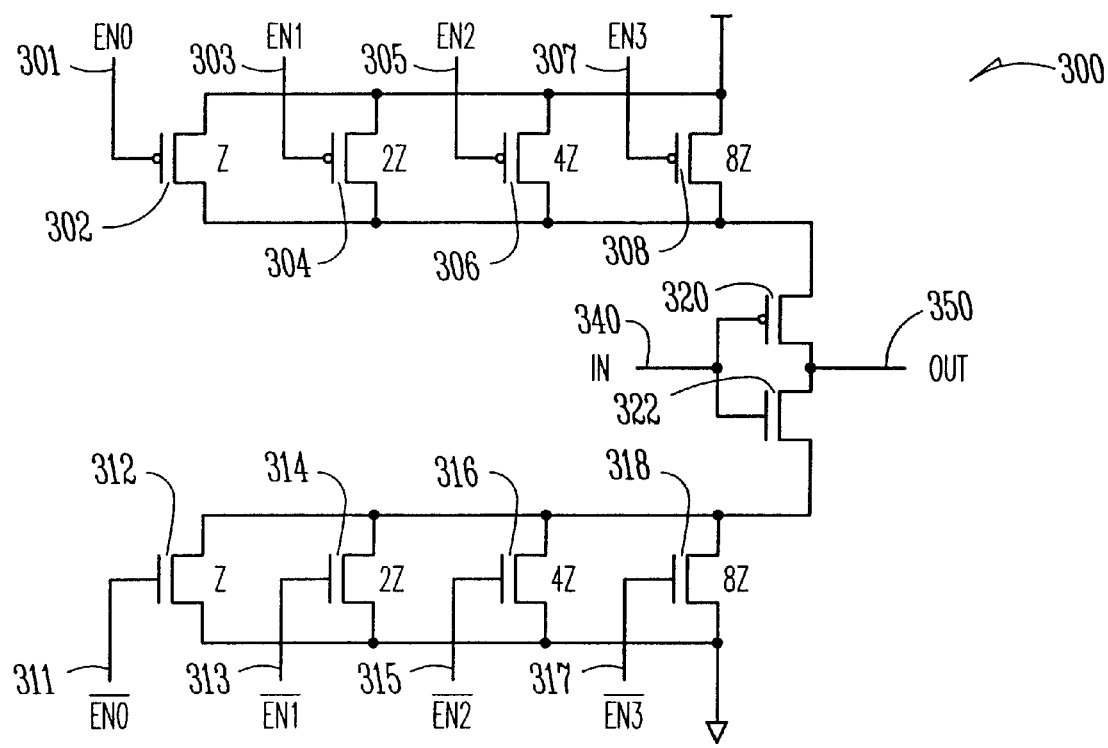
FIG. 3 shows a variable output impedance driver.

Driver 202 is a driver having a variable output impedance, one embodiment of which is shown in FIG. 3. Driver 202 includes control input node 201. Signals on control input node 201 are used to control the variable output impedance of driver 202. Impedance control circuit 120 controls the variable output impedance of driver 202 using signals on node 121, which is connected control input node 201. Node 121 is shown as a single line in FIG. 2, but in some embodiments, node 121 includes multiple physical conductors.

The output impedance of driver 202 is controlled by impedance control circuit 120. Impedance control circuit 120 includes sample and compare circuit 254, up/down counter 252, dummy driver 258, and digital filter 260. A control loop is formed by sample and compare circuit 254, up/down counter 252, and dummy driver 258. Dummy driver 258 is terminated with resistor 264. In some embodiments, resistor 264 is a precision resistor external to the integrated circuit that includes impedance control circuit 120. This allows a system designer to select a value for resistor 264, thereby selecting a reference voltage present on node 266.

The voltage on node 266, which is a function of the output impedance of dummy driver 258, is compared with a target voltage on node 268 by sample and compare circuit 254. In some embodiments, sample and compare circuit 254 is an analog comparator that samples the voltage values on nodes 266 and 268, compares them, and produces a digital signal on the output to signify which of the two input voltage values is larger. The output of sample and compare circuit 254 controls the counting of up/down counter 252. Up/down counter 252 produces an unfiltered impedance control value on node 270, which controls the output impedance of dummy driver 258, and closes the loop. When the impedance of dummy driver 258 needs to be decreased, up/down counter 252 counts in one direction, and when the impedance of dummy driver 258 needs to increase, up/down counter 252 counts in the other direction. The unfiltered impedance control value on node 270 can include a single bit, but can also include a plurality of bits. When a single bit is used, the impedance value toggles between two values, and when N bits are used, the impedance can take on any of $2^N$ different values.

When the control loop of impedance control circuit 120 locks, the unfiltered impedance control signal on node 270 alternates between two values. This results from the fact that the change in output impedance of dummy driver 258 causes the voltage on node 266 to surpass the voltage on node 268. In one embodiment, for each successive clock cycle thereafter, the unfiltered impedance control signal on node 270 alternates counting up and down as the voltage on node 266 alternates higher and lower than the target voltage on node 268.

Impedance control circuit 120 also includes digital filter 260. Digital filter 260 receives the unfiltered impedance control value on node 270 and produces a filtered impedance control value on node 121. The filtered impedance control value on node 121 controls the output impedance of driver 202 in data transceiver 106. When the loop is locked and the unfiltered impedance control signal alternates between two values, digital filter 260 provides a steady state filtered impedance control signal to driver 202 on node 121. In addition, when the loop is locked, the digital filter outputs a DONE signal on node 129, signifying that the impedance control circuit has initialized. This corresponds to the ADONE signal on node 129 (FIG. 1).

FIG. 3 shows a variable output impedance driver. Driver 300 is a driver, such as driver 202 (FIG. 2), capable of driving a bidirectional data line. Nodes 301, 303, 305, 307, 311, 313, 315, and 317 correspond to control input node 201 (FIG. 2), and the enable signals (EN0–EN3) correspond to the impedance control value on node 121 (FIG. 2).

Driver 300 includes input node 340 and output node 350. Input node 340 is coupled to the gate of PMOS transistor 320, and is also coupled to the gate of NMOS transistor 322. Transistors 320 and 322 are examples of isolated gate field effect transistors. Transistor 320 is a p-channel metal oxide semiconductor field effect transistor (PMOS) and transistor 322 is an n-channel metal oxide semiconductor field effect transistor (NMOS). Taken together, PMOS transistor 320 and NMOS transistor 322 function as an inverter. Connected in a cascode arrangement with PMOS transistor 320 are parallel PMOS transistors 302, 304, 306, and 308. Likewise, connected in a cascode arrangement with NMOS transistor 322 are parallel NMOS transistors 312, 314, 316, and 318. Any number of parallel PMOS transistors and parallel NMOS transistors can be on at any time, thereby providing a variable output impedance at node 350.

The parallel NMOS and PMOS transistors are sized with a binary weighting such that the output impedance can be controlled with a binary number. For example, PMOS transistor 302 and NMOS transistor 312 have an impedance value of "Z," PMOS transistor 304 and NMOS transistor 314 have an impedance value twice as great, and so on. The binary number in the embodiment of FIG. 3 is four bits wide corresponding to the enable signals labeled EN0 through EN3.

The use of a binary weighted impedance control mechanism allows an up/down counter to be employed to modify the impedance one value at a time. As the control signals from the up/down counter count up, more (or larger) transistors are turned on, and the output impedance drops. Likewise, as the counter counts down, the output impedance increases.

In another embodiment, linear weighting is employed. Linear weighting allows a shift register or other similar component to control the output impedance by changing one bit at a time. A driver having linear weighted impedance control allows for precise control of the output impedance with reduced chance of glitches at the expense of increased signal lines and transistor count. For example, in embodiments represented by FIG. 3, four enable signals provide 16 different output impedance values. A linear weighted output driver with 16 impedance values includes 16 parallel NMOS transistors and 16 parallel PMOS transistors driven by 16 control signals. Linear weighted drivers can be implemented without departing from the scope of the present invention.

In some embodiments, the impedance control value that controls the enable signals on nodes 301, 303, 305, 307, 311, 313, 315, and 317 is set such that a balanced output impedance is presented on node 350. For example, control signals on nodes 305 and 315 can be asserted to provide a pullup impedance of 4Z and a pulldown impedance of 4Z. Because both the pullup and pulldown impedances are substantially equal, the output impedance of driver 300 is said to be "balanced." This is in contrast to situations where an imbalanced output impedance is presented by having different pullup and pulldown impedances. One such use of an imbalanced output impedance is discussed below with reference to FIGS. 4–6.

Figure 4:
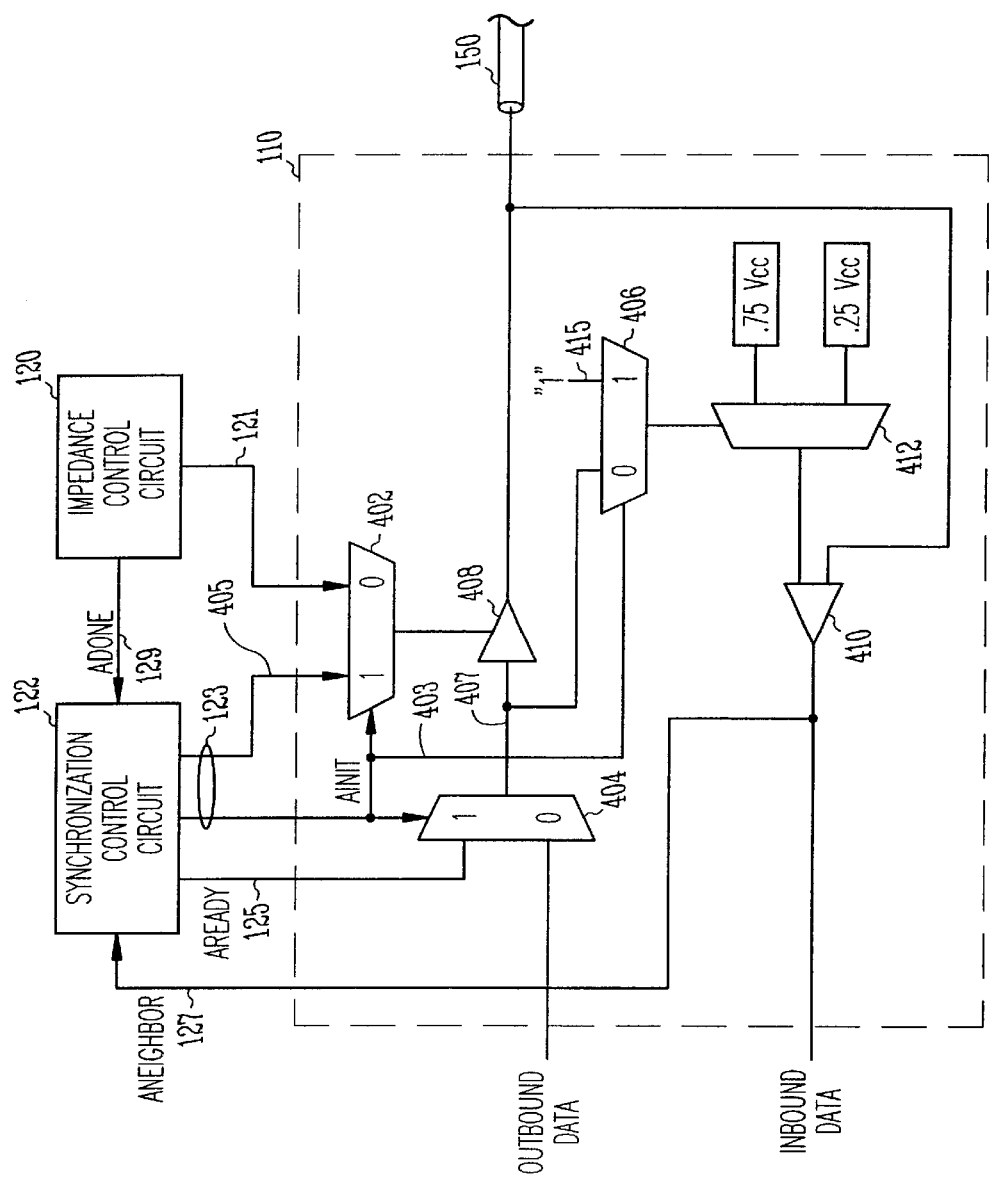
FIG. 4 shows a combination data and synchronization transceiver and associated control circuitry.

FIG. 4 shows a combination data and synchronization transceiver and associated control circuitry. Synchronization control circuit 122, impedance control circuit 120, and combination data and synchronization transceiver 110 are shown in both FIGS. 1 and 4, with FIG. 4 showing more detail of combination data and synchronization transceiver 110.

Combination data and synchronization transceiver 110 includes driver 408 and receiver 410. Driver 408 is a variable output impedance driver such as that shown in FIG. 3. Receiver 410 is a receiver such as receiver 204 (FIG. 2). Combination data and synchronization transceiver 110 also includes multiplexors 402, 404, and 406.

Combination data and synchronization transceiver operates in one of two modes, depending on the control information provided on node 123 by synchronization control circuit 122. As shown in FIG. 4, node 123 includes nodes 403 and 405. The AINIT signal on node 403 controls multiplexors 402, 404, and 406; and node 405 provides a impedance control value to driver 408 when appropriately selected. The two modes are "synchronization mode" and "data transceiver mode." The data transceiver mode is described first, in part because it is substantially similar to the operation of data transceiver 106 as described above with reference to FIG. 2.

The mode of combination data and synchronization transceiver is set by the state of the AMNIT signal on node 403. Data transceiver mode is selected when the AINIT signal is asserted as a logical zero. In this mode, multiplexor 404 takes its input from the OUTBOUND DATA node, multiplexor 402 takes its input from node 121, and multiplexor 406 takes its input from node 407. When multiplexors 402, 404, and 406 are steered in this fashion, the operation of combination data and synchronization transceiver 110 mirrors that of data transceiver 106 (FIG. 2). When in data transceiver mode, transceiver 110 operates to simultaneously send and receive data on a simultaneous bidirectional bus.

The synchronization mode is entered when the AINIT signal is asserted as a logical one. In this mode, multiplexor 404 takes its input from the AREADY signal on node 125, multiplexor 402 takes its input from node 121, and multiplexor 406 takes its input from a hard-wired logical "one" on node 415. As a result of the operation of multiplexor 406 in synchronization mode, receiver 410 always has the more positive reference (0.75 Vcc) as a threshold to compare against inbound data.

During synchronization mode, synchronization control circuit sets the output impedance of driver 408 to an imbalanced value. In some embodiments, the imbalanced output impedance includes a higher pullup impedance and a lower pulldown impedance. For example, in some embodiments, the synchronization mode output impedance of driver 408 is set such that the pullup impedance is substantially twice the pulldown impedance. In other embodiments, the pullup impedance is substantially ten times the pulldown impedance. Any other ratio of pullup impedance to pulldown impedance is possible without departing from the scope of the present invention.

When in synchronization mode, and prior to AREADY being asserted high, driver 408 pulls the voltage on conductor 150 down by presenting the pulldown impedance to conductor 150. When synchronization control circuit 122 asserts AREADY high, driver 408 pulls the voltage on conductor 150 up by presenting the relatively higher pullup impedance to conductor 150. The imbalanced output impedance of driver 408 is set such that the voltage on conductor 150 does not satisfy the threshold of receiver 410 until both driver 408 and the driver on the other end of conductor 150 assert high. This operation is described in more detail below with reference to FIGS. 5 and 6.

When both drivers on both ends of conductor 150 drive high, the signal on conductor 150 satisfies the threshold, and the output of receiver 410 changes state. This asserts the ANEIGHBOR signal on node 127, signifying that integrated circuits on both sides of the simultaneous bidirectional bus are ready to communicate. Synchronization control circuit 122 responds to the asserted ANEIGHBOR signal by transitioning combination data and synchronization transceiver 110 from synchronization mode to data transceiver mode.

Figure 5:
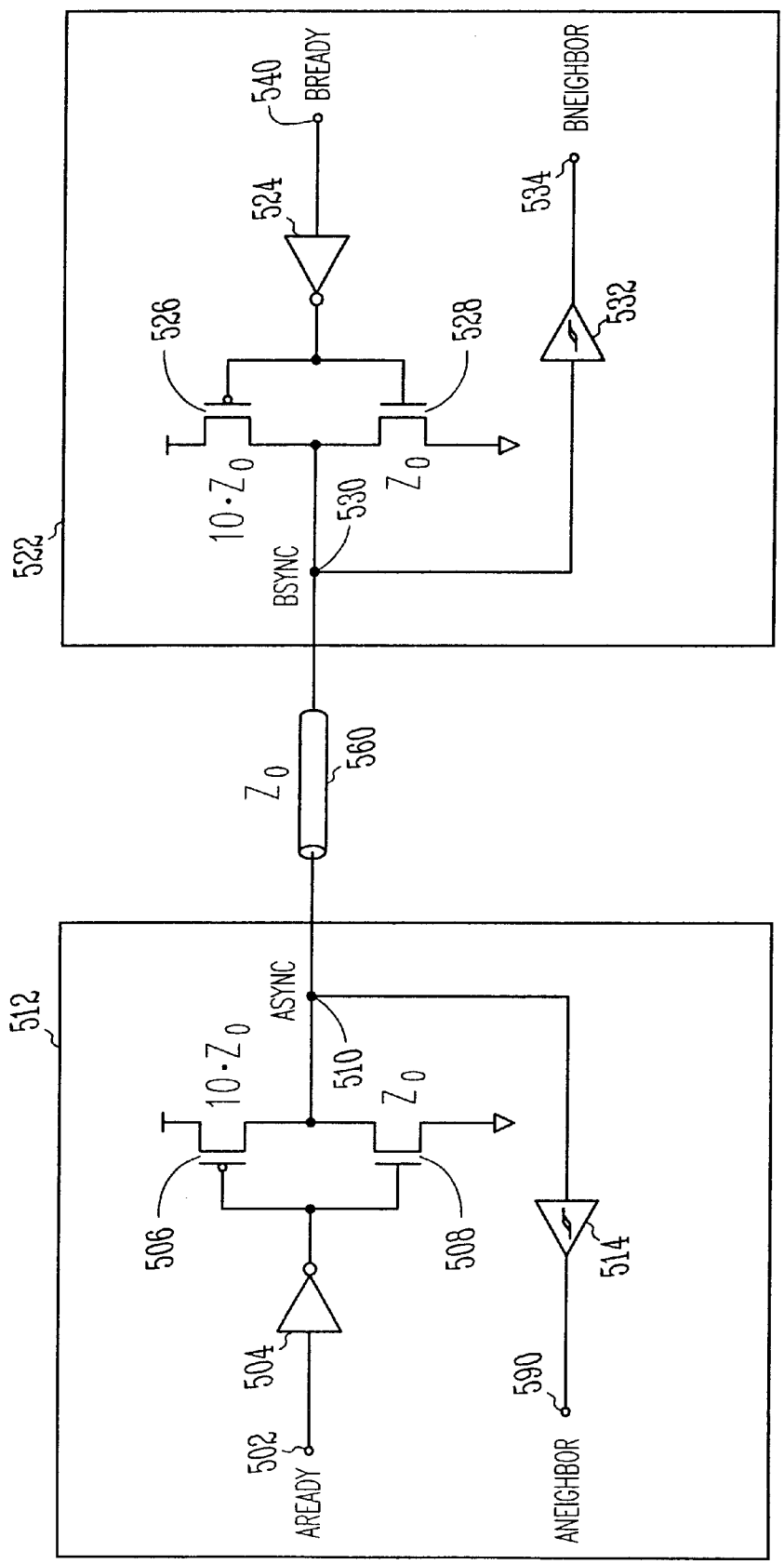
FIG. 5 shows a schematic of equivalent circuits during synchronization.

FIG. 5 shows a schematic of equivalent circuits during synchronization. Synchronization circuits 512 and 522 represent the equivalent circuits of combination data and synchronization transceivers on a simultaneous bidirectional bus while in synchronization mode. For example, circuit 512 represents combination data and synchronization transceiver 110, and circuit 522 represents combination data and synchronization transceiver 160. For the purposes of explanation, circuit 512 is considered to be within the "A" agent on the simultaneous bidirectional bus, and circuit 522 is considered to be within the "B" agent on the same simultaneous bidirectional bus. As such, nodes and signals pertaining to circuit 512 are prefixed with the letter "A," and nodes and signals pertaining to circuit 522 are prefixed with the letter "B."

Equivalent circuit 512 includes receiver 514, and a driver having an imbalanced output impedance. The driver includes inverter 504, PMOS transistor 506 and NMOS transistor 508. Circuit 512 further includes node 502 and 590. The signal on node 502 is the AREADY signal, and the signal on node 590 is the ANEIGHBOR signal. The output of the driver at node 510 is labeled ASYNC. Equivalent circuit 522 includes corresponding interfaces, nodes, and signals, prefixed with the letter "B."

PMOS transistor 506 corresponds to the equivalent pullup impedance selected from a driver with a variable output impedance. For example, in embodiments that utilize a driver similar to variable output impedance driver 300 (FIG. 3), the selection of a $10Z_0$ PMOS transistor (not shown) provides a $10Z_0$ pullup impedance. Also for example, NMOS transistor 508 represents the equivalent impedance of the pulldown transistors selected.

As shown in FIG. 5, the sizes of PMOS transistor 506 and NMOS transistor 508 are arranged such that the output impedance of PMOS transistor 506 is substantially larger than the output impedance of NMOS transistor 508, and such that the output impedance of NMOS transistor 508 substantially matches the impedance of conductor 560. For example, in the embodiment shown in FIG. 5, both conductor 560 and NMOS transistor 508 have an impedance of $Z_0$, and PMOS transistor 206 has an impedance of $10Z_0$. This provides an imbalanced output impedance with a pullup/pulldown impedance ratio of 10:1. Other embodiments include ratios other than 10:1.

In operation, when agent A is ready to communicate, such as when initialization is complete, the AREADY signal on node 502 is asserted high. AREADY can be asserted by a processor or by a dedicated circuit, such as synchronization control circuit 122 (FIG. 1). Prior to the assertion of the AREADY signal, NMOS transistor 508 is on and PMOS transistor 506 is off. As long as the driver within circuit 522 is in the same state, then the ASYNC signal on node 510 is substantially at the reference potential connected to the source of NMOS transistor 508. When the AREADY signal is asserted, NMOS transistor 508 is turned off and PMOS transistor 506 is turned on. As a result, the ASYNC signal on node 510 increases in voltage. Because the output impedance of PMOS transistor 506 is much greater than the impedance of conductor 560, a voltage divider is formed that keeps the voltage of the ASYNC signal from rising very far. When both transceiver circuits 512 and 522 assert signals onto conductor 560, then the voltage of both the ASYNC signal and the BSYNC signal will rise to close to the positive reference connected to the drain of PMOS transistor 506.

Receivers 514 and 532 are schematically shown as receivers with input hysteresis, commonly referred to as "Schmitt triggers." In some embodiments, receivers 514 and 532 are implemented using receivers with a selectable threshold, such as receiver 410 (FIG. 4). In these embodiments, the receiver has hysteresis when input signal is transitioning positive because of the higher threshold. The hysteresis of receivers 514 and 532 ensures that the output nodes change state only when the voltage on the input node satisfies the hysteresis. For example, the output of receiver 514 will change state when the voltage on the input node travels through the center point of the logic voltage swing and satisfies the higher threshold (0.75Vcc as show in FIG. 4). This provides noise immunity on the input to the receivers.

When one of AREADY or BREADY is asserted by the respective agent, the input nodes of receiver 514 and 532 will experience various voltage values as the signal reflects back and forth on conductor 560, but the input voltage value will not be high enough to satisfy the hysteresis of either receiver 514 or 532. Only when both AREADY and BREADY are asserted will the hysteresis in receivers 514 and 532 be satisfied, causing the ANEIGHBOR and BNEIGHBOR signals to be asserted. When the ANEIGHBOR signal is asserted, the agent that includes circuit 512 has an indication that both of the agents on the simultaneous bidirectional bus are ready to communicate, and when BNEIGHBOR is asserted, the agent that includes circuit 522 has an indication that both of the agents on the simultaneous bidirectional bus are ready to communicate.

FIG. 6 shows a timing diagram of the operation of the circuit of FIG. 5. The operation just described with respect to AREADY being asserted prior to BREADY being asserted is shown in FIG. 6. AREADY is asserted high at 602. This corresponds to NMOS transistor 508 turning off and PMOS transistor 506 turning on. ASYNC is shown increasing in voltage at 608 as a result of AREADY being asserted at 602. After a time equivalent to the electrical length of the transmission line, BSYNC rises in voltage at 610. BSYNC does not rise as high as ASYNC because the termination at node 530 is substantially equal to the line impedance, $Z_0$. It should be noted that it is not necessary for the pulldown impedance of either driver to equal the line impedance, but that this condition provides a satisfactory termination. After a time equal to one round-trip electrical length of the transmission line, ASYNC reduces in voltage as shown by 614. Prior to the assertion of BREADY, small reflections (not shown) travel back and forth on the transmission line (conductor 560).

Receiver threshold 606 is the voltage level necessary for either ASYNC or BSYNC to satisfy the hysteresis of either receiver 514 or 532. As can be seen in FIG. 6, the initial voltage step launched into the transmission line falls short of threshold 606 by margin 612. Margin 612 is large in part because the pullup to pulldown impedance ratio of the drivers in synchronization circuits 512 and 522 is ten to one. Other impedance ratios can be used while still maintaining adequate margin 612 so that neither ANEIGHBOR nor BNEIGHBOR is falsely asserted.

When BREADY is asserted at 604, BSYNC increases in voltage correspondingly at 616. With both AREADY and BREADY asserted, both ASYNC and BSYNC eventually increase in voltage enough to surpass receiver threshold 606, causing ANEIGHBOR and BNEIGHBOR to assert within synchronization circuits 512 and 522, respectively. Because of the impedance mismatch between line 560 and PMOS transistors 506 and 526, reflections continue to bounce back and forth across line 560 until the voltage settles out close to Vcc. The reflections are shown at 620.

The relative impedance of the pullup and pulldown transistors and the transmission line, and the hysteresis of the Schmitt trigger receivers can be varied to vary margin 612 and the amount of time (or number of reflections) before ASYNC and BSYNC cross receiver threshold 606. For example, in the embodiment shown in FIG. 6, the pullup to pulldown impedance ratio is ten to one and the ratio of the pulldown transistor to transmission line impedance ratio is one to one. In some embodiments, the pullup to pulldown ratio is five to one. This decreases margin 612, but also decreases the amount of time between the assertion of both AREADY and BREADY and when ASYNC and BSYNC cross the receiver threshold.

As can be seen from FIGS. 5 and 6, in some embodiments, the output impedance of the drivers is imbalanced with a pulldown impedance of substantially $Z_0$ and a pullup impedance of substantially $10Z_0$. As a result, the READY signal on both agents must be asserted in order for the SYNC signals to rise high enough to satisfy the hysteresis of the receivers, thereby asserting the NEIGHBOR signals on each agent. Moreover, any glitch that occurs when only one end of the link asserts the READY signal is reduced because the pullup impedance is weak compared to the pulldown impedance and compared to the link impedance of $Z_0$. Also, setting the threshold of the receivers higher than the initial voltage step into the line prevents the NEIGHBOR signal from false assertions.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A bidirectional port circuit comprising:
    a variable impedance output driver having a control input node;
    a synchronization control circuit coupled to the control input node to control the variable impedance during an initialization sequence; and
    an impedance control circuit coupled to the control input node to control the variable impedance other than during the initialization sequence.

2. The bidirectional port circuit of claim 1 wherein the variable impedance output driver comprises:
   a plurality of differently sized pullup transistors; and
   a plurality of differently sized pulldown transistors.

3. The bidirectional port circuit of claim 2 wherein the plurality of differently sized pullup transistors and the plurality of differently size pulldown transistors have control nodes coupled to the control input node of the variable impedance output driver.

4. The bidirectional port circuit of claim 1 wherein the synchronization control circuit is operable to enable at least one pullup transistor and at least one pulldown transistor, the at least one pulldown transistor having a lower impedance than the at least one pullup transistor.

5. The bidirectional port circuit of claim 4 wherein the at least one pullup transistor has an impedance greater than two times an impedance of the at least one pulldown transistor.

6. The bidirectional port circuit of claim 4 wherein the at least one pullup transistor has an impedance greater than ten times an impedance of the at least one pulldown transistor.

7. The bidirectional port circuit of claim 1 wherein the impedance control circuit is operable to enable at least one pullup transistor and at least one pulldown transistor, the at least one pulldown transistor having an impedance substantially equal to the at least one pullup transistor.

8. The bidirectional port circuit of claim 1 further including a data transceiver responsive to the impedance control circuit.

9. The bidirectional port circuit of claim 1 wherein:
   the variable impedance output driver is part of a first data transceiver;
   the bidirectional port circuit comprises a plurality of data transceivers of which the first data transceiver is one, the plurality of data transceivers being arranged from a most significant bit to a least significant bit; and
   the first data transceiver is the most significant bit.

10. The bidirectional port circuit of claim 1 wherein:
    the variable impedance output driver is part of a first data transceiver;
    the bidirectional port circuit comprises a plurality of data transceivers of which the first data transceiver is one, the plurality of data transceivers being arranged from a most significant bit to a least significant bit; and
    the first data transceiver is the least significant bit.

11. An integrated circuit having a bidirectional port comprising:
    a first data transceiver capable of being initialized;
    an initialization circuit to initialize the first data transceiver; and
    a second data transceiver operable to present an imbalanced output impedance when the first data transceiver is being initialized, and to present a balanced output impedance thereafter.

12. The integrated circuit of claim 11 wherein the second data transceiver comprises:
    a variable impedance output driver having an output node; and
    a data receiver having an input node coupled to the output node of the variable impedance output driver.

13. The integrated circuit of claim 12 wherein variable impedance output driver includes transistors of varying sizes, and the imbalanced output impedance is provided by the transistors of varying sizes.

14. The integrated circuit of claim 12 further comprising:
    a multiplexor coupled to an input node of the variable impedance output driver, the multiplexor configured to drive the variable impedance output driver with a signal from the initialization circuit or a data signal from within the integrated circuit.

15. The integrated circuit of claim 11 wherein:
    the first data transceiver includes a variable termination impedance; and
    the initialization circuit is operable to initialize the variable termination impedance of the first data transceiver.

16. The integrated circuit of claim 11 wherein the bidirectional port includes a plurality of data transceivers other than the first and second data transceivers.

17. The integrated circuit of claim 16 wherein the first, second, and plurality of data transceivers form a bus arranged from most significant bit to least significant bit, and the second data transceiver is the most significant bit.

18. The integrated circuit of claim 16 wherein the first, second, and plurality of data transceivers form a bus arranged from most significant bit to least significant bit, and the second data transceiver is the least significant bit.

19. An integrated circuit comprising:
    a data driver to drive a data signal on a first data node external to the integrated circuit;
    an initialization circuit to initialize the data driver; and
    a combination data and synchronization driver responsive to the initialization circuit such that the combination data and synchronization driver presents an imbalanced impedance to a second data node external to the integrated circuit prior to the data driver being initialized.

20. The integrated circuit of claim 19 wherein the data driver includes a variable output impedance.

21. The integrated circuit of claim 20 wherein the initialization circuit comprises an impedance control circuit to initialize the variable output impedance.

22. The integrated circuit of claim 19 wherein the integrated circuit is a circuit type from the group comprising: a processor, a processor peripheral, a memory, and a memory controller.

23. The integrated circuit of claim 19 wherein:
    the data driver is part of a first data transceiver, the first data transceiver further comprising a receiver having an input node coupled to the first data node external to the integrated circuit; and
    the combination output and synchronization driver is part of a second data transceiver, the second data transceiver further comprising a second receiver having an input node coupled to the second data node external to the integrated circuit.

24. An electronic system comprising:
    a first integrated circuit including a first simultaneous bidirectional port comprising a first variable output impedance data driver, a first data receiver, a first combination data and synchronization driver having a variable output impedance, the first integrated circuit further including a first initialization circuit operable to independently set the variable output impedance of the first variable output impedance data driver and the first combination data and synchronization driver; and
    a second integrated circuit including a second simultaneous bidirectional port comprising a second variable output impedance data driver, a second data receiver, and a second combination data and synchronization driver having a variable output impedance, the second integrated circuit further including a second initialization circuit operable to independently set the variable output impedance of the second variable output impedance data driver and the second combination data and synchronization driver;

wherein output nodes of the first and second variable output impedance data drivers are coupled in common with input nodes of the first and second data receivers, and output nodes of the first and second combination data and synchronization drivers are coupled in common.

25. The electronic system of claim 24 wherein the first initialization circuit is operable to set the variable output impedance of the first combination data and synchronization driver to an imbalanced impedance during an initialization state.

26. The electronic system of claim 25 wherein the first initialization circuit is operable to set the variable output impedances of the first combination data and synchronization driver and the first variable output impedance data driver to substantially equal impedance values after the initialization state.

27. The electronic system of claim 25 wherein the combination data and synchronization driver comprises a plurality of differently sized pullup transistors and a plurality of differently sized pulldown transistors, and the first initialization circuit is operable to select different ones of the differently sized pullup and pulldown transistors to provide the imbalanced impedance.

28. The electronic system of claim 27 wherein the first initialization circuit is operable to enable at least one pullup transistor and at least one pulldown transistor during the initialization state, the at least one pulldown transistor having a lower impedance than the at least one pullup transistor.

29. The electronic system of claim 28 wherein the at least one pullup transistor has an impedance greater than ten times an impedance of the at least one pulldown transistor.

* * * * *

UNITED STATES PATENT AND TRADEMARK OFFICE
CERTIFICATE OF CORRECTION

PATENT NO.   : 6,529,037 B1
DATED        : March 4, 2003
INVENTOR(S)  : Matthew B. Haycock, Aaron K. Martin and Stephen R. Mooney It is certified that error appears in the above-identified patent and that said Letters Patent is hereby corrected as shown below:

Title page,
Item [56], References Cited, OTHER PUBLICATIONS, "Haycock, M., et al.," delete "Singaling" and insert -- Signaling -- therefor.

Column 4,
Line 49, delete "fictions" and insert -- functions -- therefor.

Column 7,
Line 39, delete "AMNIT" and insert -- AINIT -- therefor.

Column 11,
Line 1, delete "claim 1" and insert -- claim 1 -- therefor.

Signed and Sealed this

Twenty-seventh Day of July, 2004

JON W. DUDAS
*Acting Director of the United States Patent and Trademark Office*